(12) United States Patent
Choi et al.

(10) Patent No.: US 11,593,023 B2
(45) Date of Patent: Feb. 28, 2023

(54) MEMORY CONTROLLER AND METHOD OF OPERATING THE SAME

(71) Applicant: SK hynix Inc., Icheon (KR)

(72) Inventors: Han Choi, Icheon (KR); Jin Soo Kim, Icheon (KR); Soong Sun Shin, Icheon (KR)

(73) Assignee: SK hynix Inc., Icheon (KR)

( * ) Notice: Subject to any disclaimer, the term of this patent is extended or adjusted under 35 U.S.C. 154(b) by 30 days.

(21) Appl. No.: 17/242,063

(22) Filed: Apr. 27, 2021

(65) Prior Publication Data

US 2022/0129192 A1 Apr. 28, 2022

(30) Foreign Application Priority Data

Oct. 23, 2020 (KR) .......................... 10-2020-0138369

(51) Int. Cl.
*G06F 12/00* (2006.01)
*G06F 3/06* (2006.01)

(52) U.S. Cl.
CPC .......... *G06F 3/0656* (2013.01); *G06F 3/0604* (2013.01); *G06F 3/0647* (2013.01); *G06F 3/0673* (2013.01)

(58) Field of Classification Search
CPC .... G06F 3/0656; G06F 3/0604; G06F 3/0647; G06F 3/0673; G06F 3/061; G06F 3/0679
See application file for complete search history.

(56) References Cited

U.S. PATENT DOCUMENTS

| | | | | |
|---|---|---|---|---|
| 9,424,182 | B2* | 8/2016 | Fisher | G06F 12/0897 |
| 10,860,508 | B2* | 12/2020 | Bolkhovitin | G06F 13/1668 |
| 10,871,901 | B2* | 12/2020 | Kojima | G06F 3/0688 |
| 11,048,645 | B2* | 6/2021 | Lim | G06F 21/79 |
| 11,099,988 | B2* | 8/2021 | Lee | G06F 12/0806 |
| 11,210,015 | B2* | 12/2021 | Kim | G06F 3/0611 |
| 2017/0123722 | A1* | 5/2017 | Sela | G06F 3/0611 |
| 2018/0341606 | A1* | 11/2018 | Bolkhovitin | G06F 3/0656 |
| 2019/0004949 | A1* | 1/2019 | Kim | G06F 12/0246 |
| 2019/0107947 | A1* | 4/2019 | Kojima | G06F 3/0656 |
| 2019/0236030 | A1* | 8/2019 | Lim | G06F 12/0246 |

(Continued)

FOREIGN PATENT DOCUMENTS

| KR | 10-1469512 B1 | 12/2014 |
|---|---|---|
| KR | 10-2017-0007584 A | 1/2017 |

(Continued)

*Primary Examiner* — John A Lane

(57) ABSTRACT

A memory controller and a method of operating the same may move data from a first memory buffer to a second memory buffer. The memory controller may include a host controller configured to receive host data corresponding to a program request from a host and to control transmission of the host data so that the host data is programmed to a memory device, a flash controller configured to receive flash data corresponding to a read request from the memory device and control transmission of the flash data to the host, and a memory buffer component including the first memory buffer and the second memory buffer configured to store the host data, flash data, or both. The memory controller is configured to control the memory buffer component so that the host data, flash data, or both are moved from the first memory buffer to the second memory buffer.

20 Claims, 16 Drawing Sheets

(56) References Cited

U.S. PATENT DOCUMENTS

2020/0026649 A1* 1/2020 Lee .................... G06F 11/1048
2020/0310986 A1* 10/2020 Kang ..................... G06F 12/10
2021/0357329 A1* 11/2021 Oh ...................... G06F 12/0891
2022/0083265 A1* 3/2022 Springberg ........... G06F 3/0619

FOREIGN PATENT DOCUMENTS

| KR | 10-2017-0071872 A | 6/2017 |
| KR | 10-2019-0093475 A | 8/2019 |

* cited by examiner

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0138369, filed on Oct. 23, 2020, in the Korean Intellectual Property Office, the entire disclosure of which is incorporated herein by reference.

BACKGROUND

1. Technical Field

Various embodiments of the present disclosure generally relate to an electronic device, and more particularly to a memory controller and a method of operating the memory controller.

2. Related Art

A storage device is a device which stores data under the control of a host device such as a computer, a smartphone, or a smartpad. Examples of the storage device include a device such as a hard disk drive (HDD) which stores data in a magnetic disk, and a device such as a solid state drive (SSD) or a memory card which stores data in a semiconductor memory, particularly, a nonvolatile memory, according to the device in which data is stored.

The storage device may include a memory device in which data is stored and a memory controller which controls the storage of data in the memory device. Such memory devices may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a memory controller that increases the utilization of a high-speed random access memory, such as a static random access memory (SRAM), and a method of operating the memory controller.

An embodiment of the present disclosure may provide for a memory controller. The memory controller may include a host controller configured to receive a program request and host data corresponding to the program request from a host and to control transmission of the host data so that the host data is programmed to a memory device, and a memory buffer component including a first memory buffer and a second memory buffer configured to store the host data received from the host controller, wherein the host controller is configured to control the memory buffer component so that the host data is moved from the first memory buffer to the second memory buffer.

An embodiment of the present disclosure may provide for a memory controller. The memory controller may include a flash controller configured to receive, from a memory device, flash data corresponding to a read request from a host and to control transmission of the flash data so that the flash data is output to the host, and a memory buffer component including a first memory buffer and a second memory buffer configured to store the flash data received from the flash controller, wherein the flash controller is configured to control the memory buffer component so that the flash data is moved from the first memory buffer to the second memory buffer.

DETAILED DESCRIPTION

Specific structural or functional descriptions in the embodiments of the present disclosure introduced in this specification or application are only for description of the embodiments of the present disclosure. The embodiments should not be construed as being limited to the embodiments described in the specification or application. For example, embodiments may include combinations of the described embodiments.

Various embodiments of the present disclosure will now be described more fully hereinafter with reference to the accompanying drawings, in which preferred embodiments of the present disclosure are illustrated, so that those of ordinary skill in the art can easily carry out the technical idea of the present disclosure.

Figure 1:
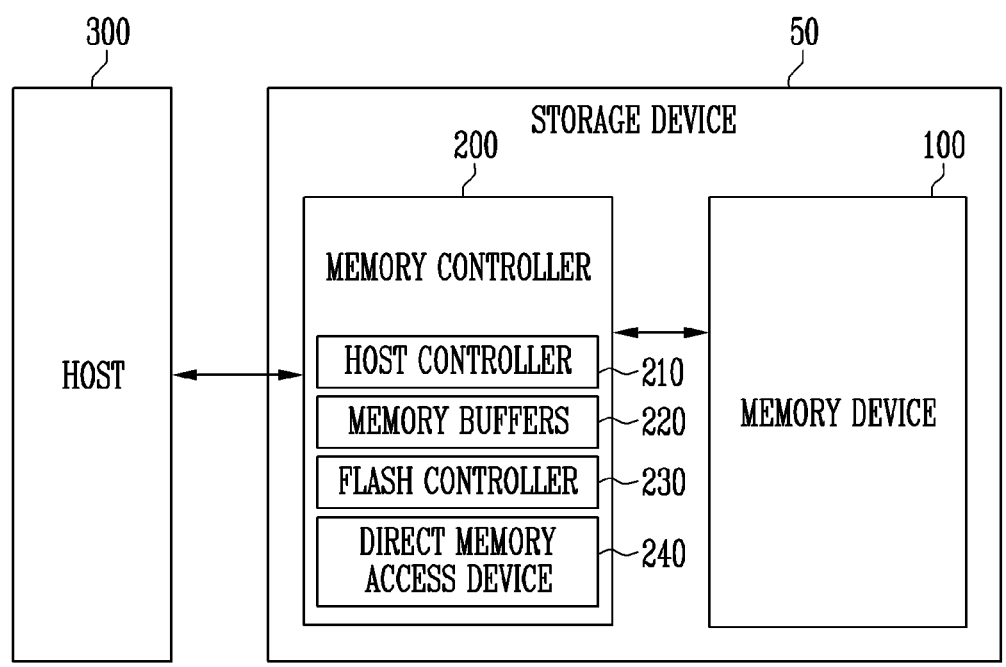
FIG. 1 is a block diagram illustrating a storage device.

FIG. 1 is a block diagram illustrating a storage device.

Referring to FIG. 1, a storage device 50 may include a memory device 100 and a memory controller 200.

The storage device 50 may be a device which stores data under the control of a host 300, such as a mobile phone, a smartphone, an MP3 player, a laptop computer, a desktop computer, a game console, a television (TV), a tablet PC, or an in-vehicle infotainment system.

The storage device 50 may be manufactured as any one of various types of storage devices depending on a host interface used for communication with the host 300. For example, the storage device 50 may be implemented as any one of a solid state disk (SSD), a multimedia card (MMC) such as an MMC, an embedded MMC (eMMC), a reduced size MMC (RS-MMC), or a micro-MMC, a secure digital (SD) card such as an SD card, a mini-SD card, or a micro-SD card, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of a package on package (POP), system in package (SIP), system on chip (SoC), multi-chip package (MCP), chip on board (COB), wafer-level fabricated package (WFP), and wafer-level stack package (WSP).

The memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells, which may constitute a plurality of pages. In an embodiment, each page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change random access memory (PRAM), a magnetoresistive RAM (MRAM), a ferroelectric RAM (FRAM), or a spin transfer torque RAM (STT-RAM). In the present specification, for convenience of description, a description will be made on the assumption that the memory device 100 is a NAND flash memory.

The memory device 100 may be implemented in a two-dimensional (2D) array structure or a three-dimensional (3D) array structure. Hereinafter, although a 3D array structure is described as an embodiment, the present disclosure is not limited to the 3D array structure. The present disclosure may also be applied not only to a flash memory device in which a charge storage layer is formed of a conductive floating gate (FG), but also to a charge trap flash (CTF) memory device in which a charge storage layer is formed of an insulating layer.

In an embodiment, the memory device 100 may be operated in a single-level cell (SLC) manner in which one data bit is stored in one memory cell. Alternatively, the memory device 100 may be operated in a manner in which at least two data bits are stored in one memory cell. For example, the memory device 100 may be operated in a multi-level cell (MLC) manner in which two data bits are stored in one memory cell, a triple-level cell (TLC) manner in which three data bits are stored in one memory cell, or a quadruple-level cell (QLC) manner in which four data bits are stored in one memory cell.

The memory device 100 may receive a command and an address from the memory controller 200, and may access the area of the memory cell array selected by the address. That is, the memory device 100 may perform an operation corresponding to the command on the area selected by the address. For example, the memory device 100 may perform a write operation (i.e., program operation), a read operation, or an erase operation in response to the received command. When a program command is received, the memory device 100 may program data to the area selected by the address. When a read command is received, the memory device 100 may read data from the area selected by the address. When an erase command is received, the memory device 100 may erase data stored in the area selected by the address.

The memory controller 200 may control the overall operation of the storage device 50.

When a supply voltage is applied to the storage device 50, the memory controller 200 may run firmware. When the memory device 100 is a flash memory device 100, the memory controller 200 may run firmware such as a Flash Translation Layer (FTL) for controlling communication between the host 300 and the memory device 100.

In an embodiment, the memory controller 200 may include firmware (not illustrated) which may receive data and a logical block address (LBA) from the host 300, and may translate the logical block address (LBA) into a physical block address (PBA) indicating the address of memory cells which are included in the memory device 100 and in which data is to be stored. Further, the memory controller 200 may store a logical-physical address mapping table, which indicates mapping relationships between logical block addresses (LBA) and physical block addresses (PBA), in a buffer memory.

The memory controller 200 may control the memory device 100 so that a program operation, a read operation, or an erase operation is performed in response to a request received from the host 300. For example, when a program request is received from the host 300, the memory controller 200 may convert the program request into a program command, and may provide the program command, a physical block address (PBA), and data to the memory device 100. When a read request together with a logical block address is received from the host 300, the memory controller 200 may convert the read request into a read command, select a physical block address corresponding to the logical block address, and thereafter provide the read command and the physical block address (PBA) to the memory device 100. When an erase request together with a logical block address is received from the host 300, the memory controller 200 may convert the erase request into an erase command, select a physical block address corresponding to the logical block address, and thereafter provide the erase command and the physical block address (PBA) to the memory device 100.

In an embodiment, the memory controller 200 may autonomously generate a program command, an address, and data without receiving a request from the host 300, and may transmit them to the memory device 100. For example, the memory controller 200 may provide commands, addresses, and data to the memory device 100 so as to perform background operations, such as a program operation for wear leveling and a program operation for garbage collection.

In an embodiment, the memory controller 200 may include a host controller 210. The host controller 210 may transfer host data received from the host 300 to one or more memory buffers 220. Here, the host data may be data received, together with a program request, from the host 300.

In an embodiment, the host controller 210 may output flash data to the host 300. The flash data may be data corresponding to a read request from the host 300, and may be data output from the memory device 100.

The host controller 210 may output a request to transmit data, stored in a specific memory buffer area, to an additional memory buffer area. Thereafter, when all of the data stored in the specific memory buffer area has been transmitted to the additional memory buffer area, the allocation of the specific memory buffer area may be released.

In an embodiment, the memory controller 200 may include the memory buffers 220. The memory buffers 220 may include first and second memory buffers. Here, the first memory buffer may be a static random access memory (SRAM), and the second memory buffer may be a dynamic random access memory (DRAM). The first and second memory buffers may temporarily store the host data before outputting the host data to the memory device 100 or may temporarily store the flash data before outputting the flash data to the host 300.

The first memory buffer has the advantage of being faster than the second memory buffer, but the available capacity of the first memory buffer may be smaller than that of the second memory buffer due to economic considerations. Therefore, when the first memory buffer is occupied by data for a long period of time, there is a concern that the utilization (availability) of the first memory buffer will be deteriorated.

In the present disclosure, in order to increase the utilization of the first memory buffer, data in the first memory buffer may be moved to the second memory buffer. Here, the utilization may be an effective utilization, that is, utilization of the first memory buffer by data for which the increased speed of the first memory buffer may provide an improvement in the performance of the storage device 50.

In an embodiment, the memory controller 200 may include a flash controller 230. The flash controller 230 may transfer flash data received from the memory device 100 to the memory buffers 220. Here, the flash data may be data corresponding to a read request, and may be data received from the memory device 100.

In an embodiment, the flash controller 230 may output the host data to the memory device 100. The host data may be data corresponding to a program request from the host 300, and may be data output from the host 300.

The flash controller 230 may output a request to transmit data, stored in a specific memory buffer area, to an additional memory buffer area. Thereafter, when all of the data stored in the specific memory buffer area has been transmitted to the additional memory buffer area, the allocation of the specific memory buffer area may be released.

In an embodiment, the memory controller 200 may include a direct memory access device 240. The direct memory access device 240 may transmit host data or flash data stored in the specific memory buffer area to an additional memory buffer area.

In other embodiments, when the host controller 210 is capable of transmitting the host data stored in the specific memory buffer area to the additional memory buffer area, the memory controller 200 may not include the direct memory access device 240. Further, when the flash controller 230 is capable of transmitting the flash data stored in the specific memory buffer area to an additional memory buffer area, the memory controller 200 may not include the direct memory access device 240.

In an embodiment, the storage device 50 may include a buffer memory (not illustrated). The memory controller 200 may control data exchange between the host 300 and the buffer memory (not illustrated). Alternatively, the memory controller 200 may temporarily store system data for controlling the memory device 100 in the buffer memory. For example, the memory controller 200 may temporarily store data, input from the host 300, in the buffer memory, and may then transmit the data, temporarily stored in the buffer memory, to the memory device 100.

In various embodiments, the buffer memory may be used as a working memory or a cache memory for the memory controller 200. The buffer memory may store codes or commands that are executed by the memory controller 200. Alternatively, the buffer memory may store data that is processed by the memory controller 200.

In an embodiment, the buffer memory may be implemented as a DRAM such as a double data rate SDRAM (DDR SDRAM), a double data rate fourth generation (DDR4) SDRAM, a low power double data rate fourth generation (LPDDR4) SDRAM, a graphics double data rate (GDDR) SDRAM, a low power DDR (LPDDR) SDRAM, or a Rambus DRAM (RDRAM), or as a static RAM (SRAM).

In various embodiments, the buffer memory may be coupled to the storage device 50 from outside the storage device 50. In this case, volatile memory devices coupled to the outside of the storage device 50 may function as the buffer memory.

In an embodiment, the memory controller 200 may control at least two memory devices 100. In this case, the memory controller 200 may control the memory devices 100 using an interleaving scheme to improve operating performance.

The host 300 may communicate with the storage device 50 using at least one of various communication methods, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
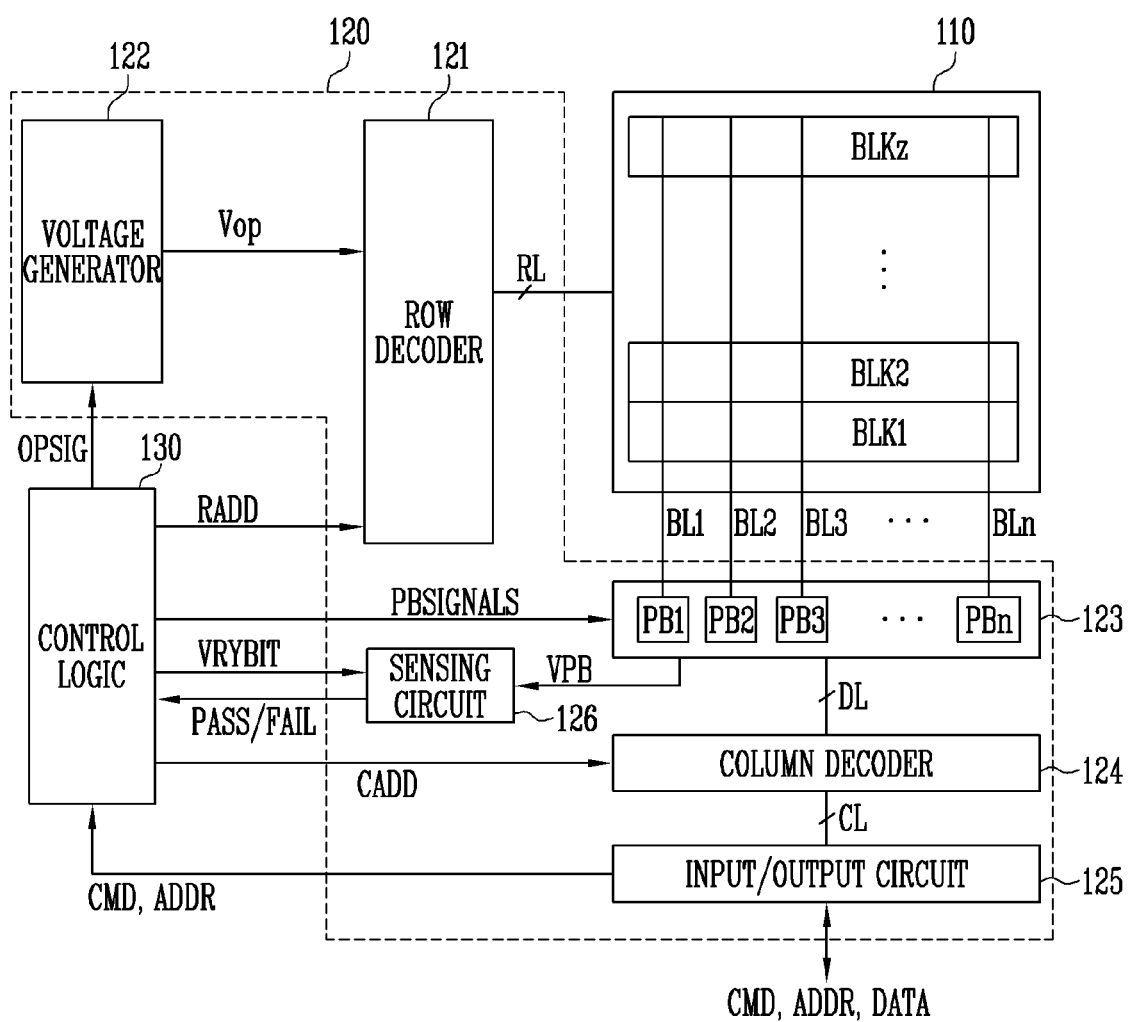
FIG. 2 is a diagram illustrating the structure of a memory device of FIG. 1.

FIG. 2 is a diagram illustrating the structure of the memory device of FIG. 1.

Referring to FIG. 2, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz are coupled to a row decoder 121 through row lines RL. Each of the memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as a single page. Therefore, a single memory block may include a plurality of pages.

The row lines RL may include at least one source select line, a plurality of word lines, and at least one drain select line.

Each of the memory cells included in the memory cell array 110 may be implemented as a single-level cell (SLC) capable of storing one data bit, a multi-level cell (MLC) capable of storing two data bits, a triple-level cell (TLC) capable of storing three data bits, or a quadruple-level cell (QLC) capable of storing four data bits.

The peripheral circuit 120 may perform a program operation, a read operation, or an erase operation on a selected area of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 is coupled to the memory cell array 110 through the row lines RL. The row lines RL may include the at least one source select line, the plurality of word lines, and the at least one drain select line. In an embodiment, the word lines may include normal word lines and dummy word lines. In an embodiment, the row lines RL may further include a pipe select line.

The row decoder 121 may decode a row address RADD received from the control logic 130. The row decoder 121 selects at least one of the memory blocks BLK1 to BLKz according to the decoded address. Further, the row decoder 121 may select at least one word line WL of the selected memory block so that voltages generated by the voltage generator 122 are applied to the at least one word line WL according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory device 100 is performed on a memory block basis. During an erase operation, the row decoder 121 may select one memory block according to the decoded address. During the erase operation, the row decoder 121 may apply a ground voltage to word lines coupled to the selected memory block.

The voltage generator 122 may be operated under the control of the control logic 130. The voltage generator 122 may generate a plurality of voltages using an external supply voltage provided to the memory device 100. In detail, the voltage generator 122 may generate various operating voltages Vop that are used for program, read, and erase operations in response to an operation signal OPSIG. For example, the voltage generator 122 may generate a program voltage, a verify voltage, a pass voltages, a read voltage, an erase voltage, etc. under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage.

For example, the voltage generator 122 may include a plurality of pumping capacitors for receiving the internal supply voltage and generate a plurality of voltages by selectively enabling the plurality of pumping capacitors under the control of the control logic 130.

The generated voltages may be supplied to the memory cell array 110 by the row decoder 121.

The page buffer group 123 includes first to nth page buffers PB1 to PBn. The first to nth page buffers PB1 to PBn are coupled to the memory cell array 110 through the first to nth bit lines BL1 to BLn. The first to nth page buffers PB1 to PBn are operated under the control of the control logic 130. In detail, the first to nth page buffers PB1 to PBn may be operated in response to page buffer control signals PBSIGNALS. For example, the first to nth page buffers PB1 to PBn may temporarily store data received through the first to nth bit lines BL1 to BLn or may sense voltages or currents of the bit lines BL1 to BLn during a read or verify operation.

In detail, during a program operation, when the program voltage is applied to the selected word line, the first to nth page buffers PB1 to PBn may transfer the data DATA, received through the input/output circuit 125, to selected memory cells through the first to nth bit lines BL1 to BLn. The memory cells in the selected page are programmed based on the received data DATA. During a program verify operation, the first to nth page buffers PB1 to PBn may read page data by sensing the voltages or currents received through the first to nth bit lines BL1 to BLn from the selected memory cells.

During a read operation, the first to nth page buffers PB1 to PBn may read data DATA from the memory cells in the selected page through the first to nth bit lines BL1 to BLn, and may output the read data DATA to the input/output circuit 125 under the control of the column decoder 124.

During the erase operation, the first to nth page buffers PB1 to PBn may allow the first to nth bit lines BL1 to BLn to float or may apply the erase voltage to the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL or may exchange data with the input/output circuit 125 through column lines CL.

The input/output circuit 125 may transfer a command CMD and an address ADDR, received from the memory controller (e.g., memory controller 200 of FIG. 1) described above with reference to FIG. 1, to the control logic 130, or may exchange data DATA with the column decoder 124.

During a read operation or a verify operation, the sensing circuit 126 may generate a reference current in response to an enable bit VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIGNALS, and the enable bit VRYBIT in response to the command CMD and the address ADDR. For example, the control logic 130 may control a read operation on a selected memory block in response to a sub-block read command and an address. Also, the control logic 130 may control an erase operation on a selected sub-block included in a selected memory block in response to a sub-block erase command and an address. In addition, the control logic 130 may determine whether a verify operation has passed or failed in response to the pass or fail signal PASS or FAIL.

Figure 3:
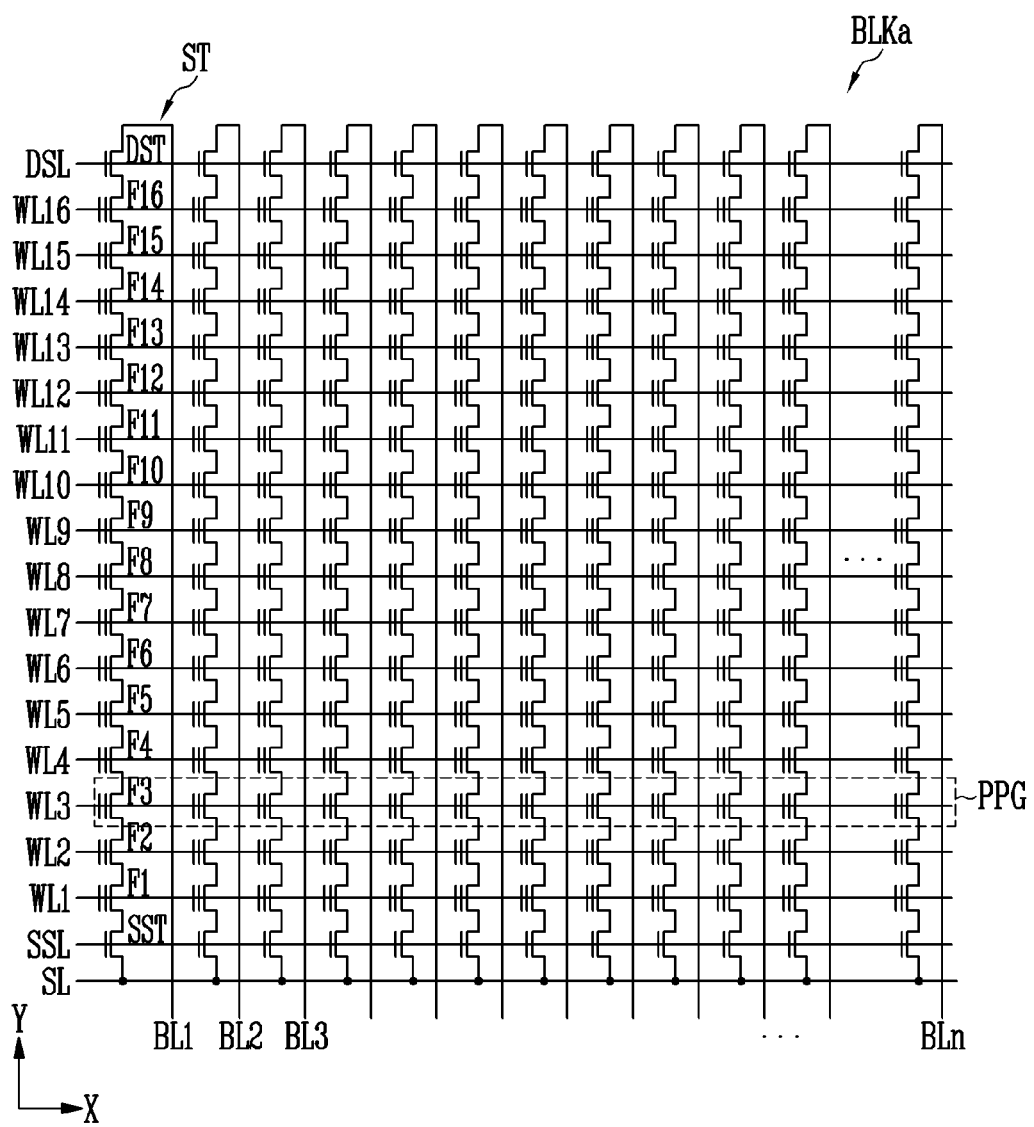
FIG. 3 is a diagram illustrating an embodiment of a memory cell array of FIG. 2.

FIG. 3 is a diagram illustrating an embodiment of the memory cell array of FIG. 2.

Referring to FIGS. 2 and 3, FIG. 3 is a circuit diagram illustrating any one memory block BLKa of a plurality of memory blocks BLK1 to BLKz included in the memory cell array 110 of FIG. 2.

The memory block BLKa may be coupled to a first select line, word lines, and a second select line that are coupled in parallel to each other. For example, the word lines may be coupled in parallel to each other between the first and second select lines. Here, the first select line may be a source select line SSL, and the second select line may be a drain select line DSL.

In detail, the memory block BLKa may include a plurality of strings coupled between bit lines BL1 to BLn and a source line SL. The bit lines BL1 to BLn may be coupled to the strings, respectively, and the source line SL may be coupled in common to the strings. Since the strings may be equally configured, a string ST coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. A single string ST may include at least one source select transistor SST and at least one drain select transistor DST, and more memory cells than the memory cells F1 to F16 illustrated in the drawing may be included in the string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors included in different strings ST may be coupled to the source select line SSL, gates of the drain select transistors included in different strings ST may be coupled to the drain select line DSL, and gates of the memory cells F1 to F16 may be coupled to a plurality of word lines WL1 to WL16, respectively. A group of memory cells coupled to the same word line, among the memory cells included in different strings ST, may be referred to as a "physical page: PPG". Therefore, the memory block BLKa may include a number of physical pages PPG identical to the number of word lines WL1 to WL16.

One memory cell may store one bit of data. This cell is typically designated as a "single-level cell: SLC". Here, one physical page PPG may store data corresponding to one logical page LPG. The data corresponding to one logical page LPG may include a number of data bits identical to the number of memory cells included in one physical page PPG. Alternatively, one memory cell may store two or more bits of data. This cell is typically designated as a "multi-level cell: MLC". Here, one physical page PPG may store data corresponding to two or more logical pages LPG.

A memory cell in which two or more bits of data are stored in one memory cell is called a multi-level cell (MLC). However, recently, as the number of data bits stored in one memory cell increases, the multi-level cell (MLC) refers to a memory cell in which two bits of data are stored, and thus a memory cell in which three or more bits of data are stored is called a triple-level cell (TLC) and a memory cell in which four or more bits of data are stored is called a quadruple-level cell (QLC). In addition, a memory cell scheme in which multiple bits of data are stored has been developed, and the present embodiment may be applied to the memory device 100 in which two or more bits of data are stored.

In an embodiment, each of the memory blocks may have a three-dimensional (3D) structure. Each of the memory blocks may include a plurality of memory cells stacked on a substrate. The plurality of memory cells may be arranged in +X, +Y, and +Z directions.

Figure 4:
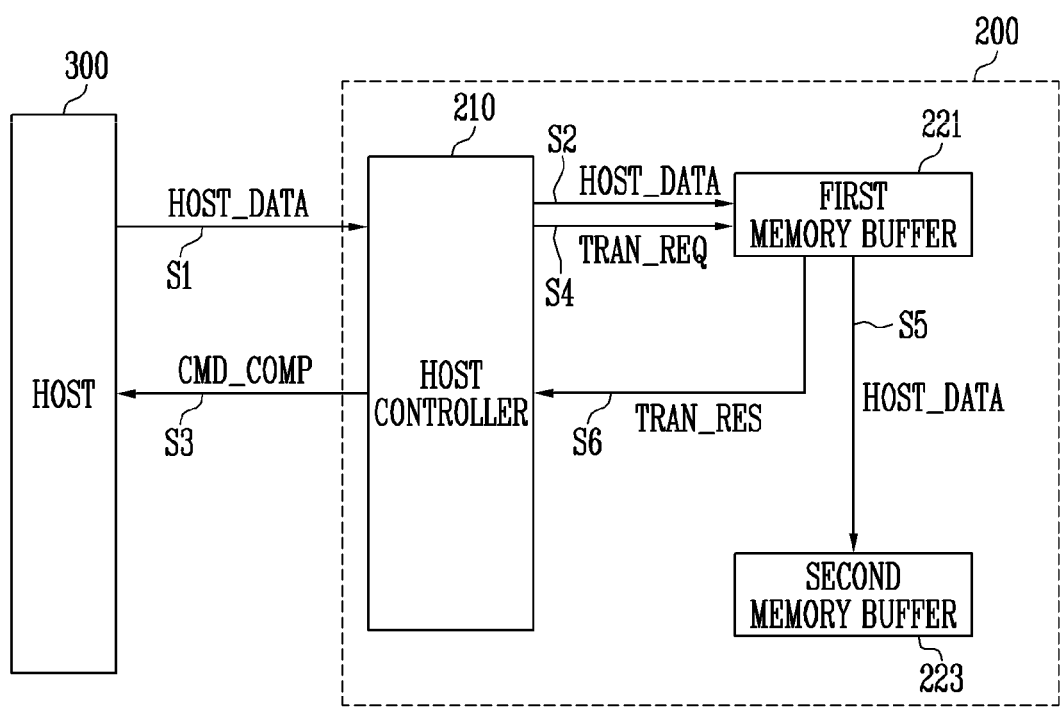
FIG. 4 illustrates an embodiment in which host data is moved from a first memory buffer to a second memory buffer.

FIG. 4 illustrates an embodiment in which host data is moved from a first memory buffer to a second memory buffer.

Referring to FIG. 4, the memory controller 200 of FIG. 4 may include a host controller 210, a first memory buffer 221, and a second memory buffer 223. Here, the first and second memory buffers 221 and 223 may be included in the memory buffers 220 of FIG. 1.

In FIG. 4, of the components of the memory controller 200 illustrated in FIG. 1, a flash controller 230 and a direct memory access device 240 are not shown.

In an embodiment, the first memory buffer 221 may be a static random access memory (SRAM), and the second memory buffer 223 may be a dynamic random access memory (DRAM). The first memory buffer 221 has the advantage of being faster than the second memory buffer 223, but the available capacity of the first memory buffer 221 may be smaller than that of the second memory buffer 223 for economic reasons. Therefore, as the utilization of the first memory buffer 221 is increased, the performance of a storage device (e.g., storage device 50 of FIG. 1) may be improved.

However, when host data HOST_DATA received from the host 300 is programmed to the memory device (e.g., memory device 100 of FIG. 1), a program completion response may be output to the host 300 even before the host data HOST_DATA is programmed to the memory device. That is, in order to improve a program speed, when the host data HOST_DATA is stored in the first memory buffer 221, the program completion response may be output to the host 300. In this case, since the host data HOST_DATA is not yet programmed to the memory device, the memory controller 200 needs to maintain the data stored in the first memory buffer 221.

In embodiments, even when the host data HOST_DATA has been output to the memory device (e.g., memory device 100 of FIG. 1), the memory controller 200 needs to maintain the data stored in the first memory buffer 221 so as to prepare for the occurrence of a program fail or the like.

As described above, when there is a need to maintain the data stored in the first memory buffer 221, the utilization of the first memory buffer 221 may be decreased, and thus the performance of the storage device (e.g., storage device 50 of FIG. 1) may be deteriorated. Therefore, in the present disclosure, a scheme for improving the utilization of the first memory buffer 221 is presented.

In an embodiment, the host 300 may output the host data HOST_DATA to be programmed to the memory device (e.g., memory device 100 of FIG. 1), together with a program request, to the host controller 210 (51). The host controller 210 may output the host data HOST_DATA, received from the host 300, to the first memory buffer 221 (S2). Here, the data stored in the first memory buffer 221 may be output and programmed to the memory device.

In an embodiment, when all of the host data HOST_DATA is stored in the first memory buffer 221, the host controller 210 may output a command completion response CMD_COMP, indicating that the execution of the command has been completed, to the host 300 (S3). That is, the command completion response CMD_COMP may be output regardless of the completion of an operation corresponding to the command. Also, before the host data HOST_DATA is output and programmed to the memory device (e.g., memory device 100 of FIG. 1), the command completion response CMD_COMP may be output, and thus a program speed may be improved.

In an embodiment, after the host data HOST_DATA has been stored in the first memory buffer 221, the host data HOST_DATA stored in the first memory buffer 221 may be moved to the second memory buffer 223. Since the host data HOST_DATA is data to be programmed to the memory device (e.g., memory device 100 of FIG. 1), it may be predicted that the first memory buffer 221 will be occupied by the host data HOST_DATA for a long period of time before the host data HOST_DATA is finished being programmed to the memory device. Therefore, the host data HOST_DATA stored in the first memory buffer 221 may be moved to the second memory buffer 223. This may allow, for example, the host data HOST_DATA to still be available in the memory controller 200 for use in case of a program fail in the memory device. That is, in order to increase the utilization of the first memory buffer 221, after the host data HOST_DATA has been stored in the first memory buffer 221, the host data HOST_DATA stored in the first memory buffer 221 may be moved to the second memory buffer 223.

In detail, the host controller 210 may output a transmission request TRAN_REQ instructing that the host data HOST_DATA, stored in the first memory buffer 221, be moved to the second memory buffer 223 (S4). The first memory buffer 221 may transmit the stored host data HOST_DATA to the second memory buffer 223 in response to the transmission request TRAN_REQ (S5). The second memory buffer 223 may receive and store the host data HOST_DATA output from the first memory buffer 221.

Thereafter, in order to access the corresponding host data HOST_DATA, the second memory buffer 223 instead of the first memory buffer 221 may be utilized. Also, the area of the first memory buffer 221, which was allocated to store the host data HOST_DATA, may be released.

Furthermore, when the movement of all of the host data HOST_DATA from the first memory buffer 221 to the second memory buffer 223 has been completed in response to the transmission request TRAN_REQ, the first memory buffer 221 may output a transmission completion response TRAN_RES to the host controller 210 (S6). Thereafter, the host 300 may output new host data to the host controller 210, and the new host data may be stored in the area of the first memory buffer 221.

That is, once the allocation of the area of the first memory buffer 221 is released, additional data may be stored in that area of the first memory buffer 221. The additional data may be new host data received from the host 300, or new flash data received from the memory device.

As a result, the data stored in the first memory buffer 221 is moved to the second memory buffer 223, after which the second memory buffer 223 may be accessed and the allocation of the area of the first memory buffer 221 is released, thus increasing the utilization of the first memory buffer 221. As the utilization of the first memory buffer 221 is increased, the performance of the storage device (e.g., storage device 50 of FIG. 1) may be improved.

Figure 5:
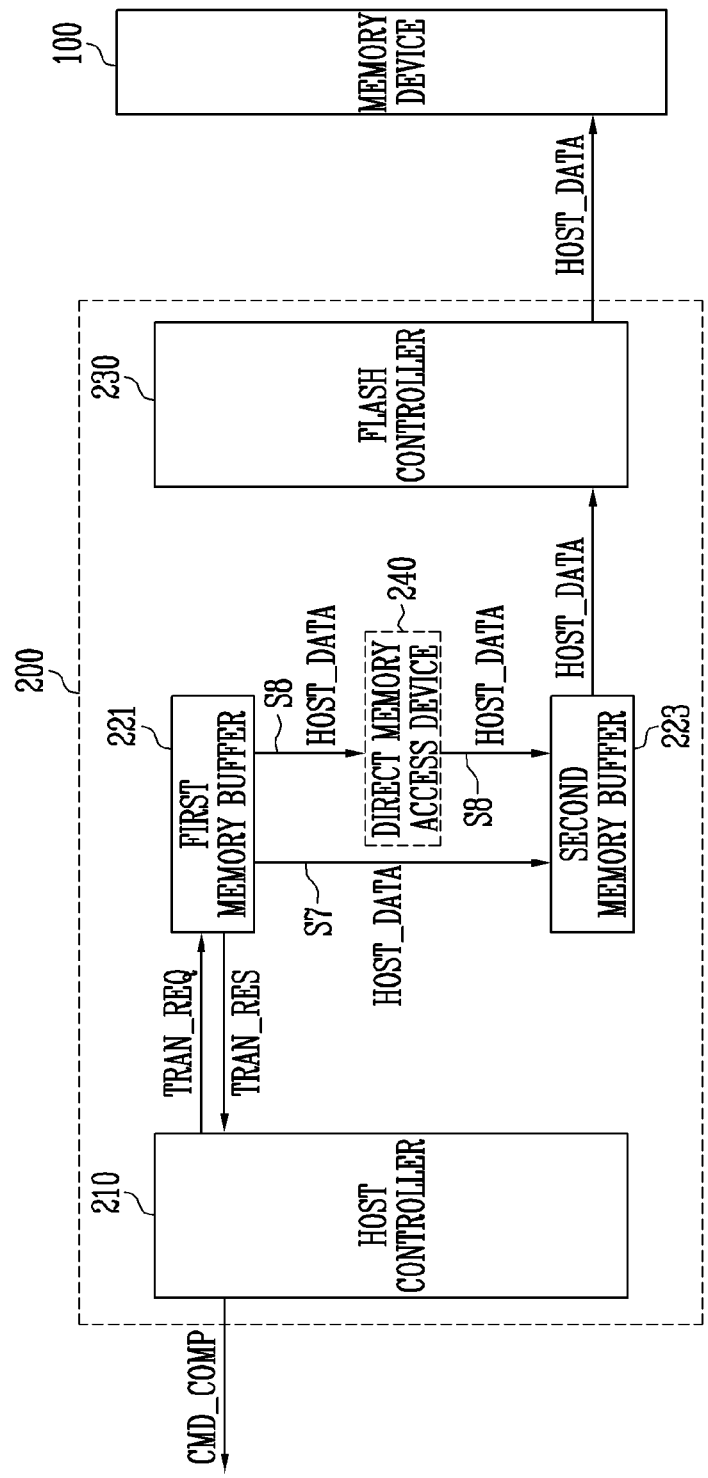
FIG. 5 illustrates a method in which host data in a first memory buffer is moved to a second memory buffer.

FIG. 5 illustrates a method in which host data in a first memory buffer is moved to a second memory buffer.

Referring to FIG. 5, the memory controller 200 of FIG. 5 may include a host controller 210, a first memory buffer 221, a second memory buffer 223, a flash controller 230, and a direct memory access device 240. Here, the first and second memory buffers 221 and 223 may be included in the memory buffers 220 of FIG. 1.

In an embodiment, after host data HOST_DATA has been stored in the first memory buffer 221, the host data HOST_DATA stored in the first memory buffer 221 may be moved to the second memory buffer 223 in order to increase the utilization of the first memory buffer 221.

In detail, the host controller 210 may output a transmission request TRAN_REQ to the first memory buffer 221. The transmission request TRAN_REQ may be a request to transmit the host data HOST_DATA stored in the first memory buffer 221 to the second memory buffer 223. The first memory buffer 221 may transmit the host data HOST_DATA to the second memory buffer 223 in response to the transmission request TRAN_REQ. The second memory buffer 223 may store the host data HOST_DATA transmitted from the first memory buffer 221.

In an embodiment, the data output from the first memory buffer 221 may be directly transmitted to the second memory buffer 223 (S7). In another embodiment, the data output from the first memory buffer 221 may be transmitted to the second memory buffer 223 using the direct memory access device 240 (S8). The second memory buffer 223 may store the host data HOST_DATA transmitted from the first memory buffer 221.

Thereafter, when the allocation of the first memory buffer 221 is released, new host data received from a host (e.g., host 300 of FIG. 4) through the host controller 210 may be stored in the first memory buffer 221 or new flash data received from the memory device 100 may be stored in the first memory buffer 221.

In an embodiment, the second memory buffer 223 may output the host data HOST_DATA, transmitted from the first memory buffer 221, to the flash controller 230. The flash controller 230 may output the host data HOST_DATA to the memory device 100, and the memory device 100 may program the host data HOST_DATA.

In an embodiment, after the host data HOST_DATA stored in the first memory buffer 221 has been moved to the second memory buffer 223, the first memory buffer 221 may release the allocation of the area in which the host data HOST_DATA was stored, and may store additional data in the corresponding area. The additional data may be new host data received from the host (e.g., host 300 of FIG. 4), or new flash data received from the memory device 100.

Figure 6:
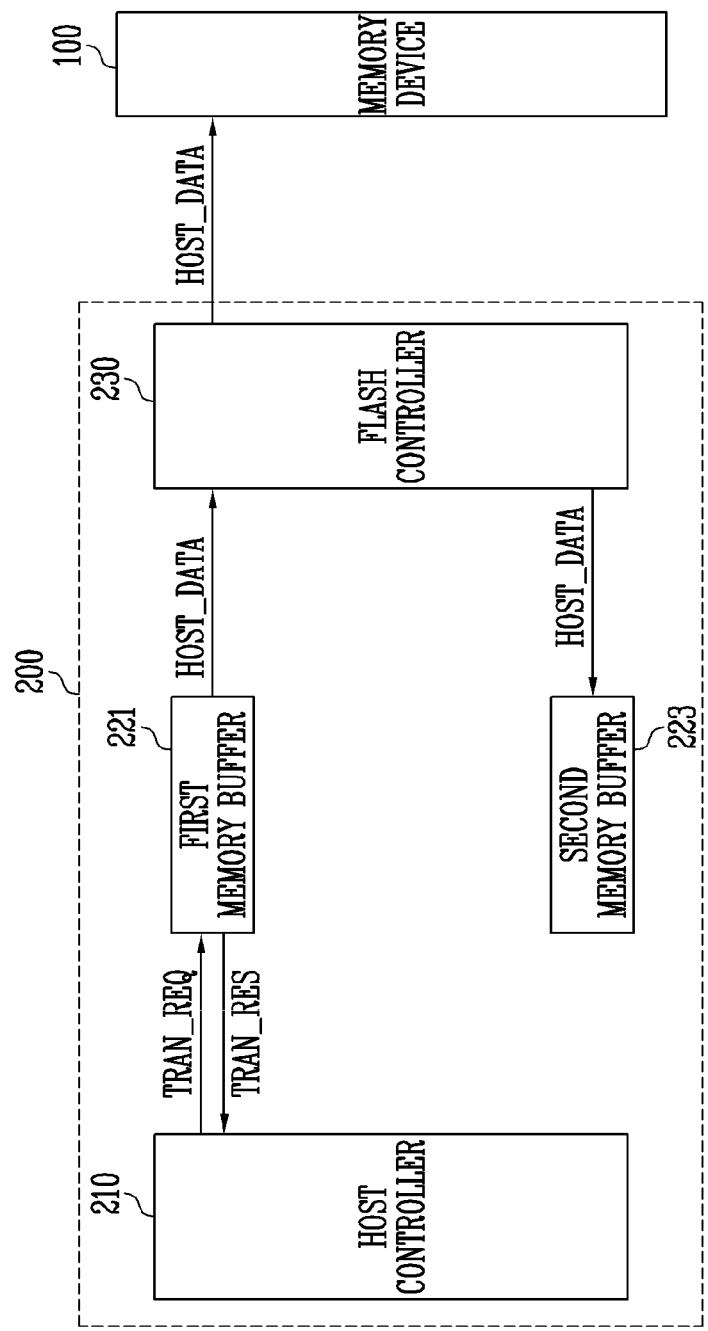
FIG. 6 illustrates another embodiment in which host data in a first memory buffer is moved to a second memory buffer.

FIG. 6 illustrates an embodiment in which host data in a first memory buffer is moved to a second memory buffer.

Referring to FIG. 6, the memory controller 200 of FIG. 6 may include a host controller 210, a first memory buffer 221, a second memory buffer 223, and a flash controller 230. Here, the first and second memory buffers 221 and 223 may be included in the memory buffers 220 of FIG. 1. In FIG. 6, of the components of the memory controller 200 illustrated in FIG. 1, a direct memory access device 240 is not shown.

In an embodiment, in order to improve the utilization of the first memory buffer 221, the host data HOST_DATA stored in the first memory buffer 221 may be moved to the second memory buffer 223.

In detail, the host controller 210 may output a transmission request TRAN_REQ to the first memory buffer 221. The transmission request TRAN_REQ may be a request to transmit the host data HOST_DATA stored in the first memory buffer 221 to the second memory buffer 223.

The first memory buffer 221 may transmit the host data HOST_DATA to the flash controller 230 in response to the transmission request TRAN_REQ. The flash controller 230 may output the host data HOST_DATA received from the first memory buffer 221 to the memory device 100, and the memory device 100 may program the host data HOST_DATA Here, the flash controller 230 may output the host data HOST_DATA not only to the memory device 100 but also to the second memory buffer 223. That is, in order to program the host data HOST_DATA to the memory device 100, the flash controller 230 may read the host data HOST_DATA from the first memory buffer 221 while transmitting the read host data HOST_DATA to the second memory buffer 223. The second memory buffer 223 may store the host data HOST_DATA received from the flash controller 230.

In an embodiment, after the host data HOST_DATA stored in the first memory buffer 221 has been moved to the second memory buffer 223, the first memory buffer 221 may release the allocation of the area in which the host data HOST_DATA was stored, and may store additional data in the corresponding area. The additional data may be new host data received from the host (e.g., host 300 of FIG. 1), or new flash data received from the memory device 100.

Thereafter, when the allocation of the first memory buffer 221 is released, new host data received from the host (e.g., host 300 of FIG. 4) through the host controller 210 may be stored in the first memory buffer 221, and/or new flash data received from the memory device 100 may be stored in the first memory buffer 221.

Figure 7:
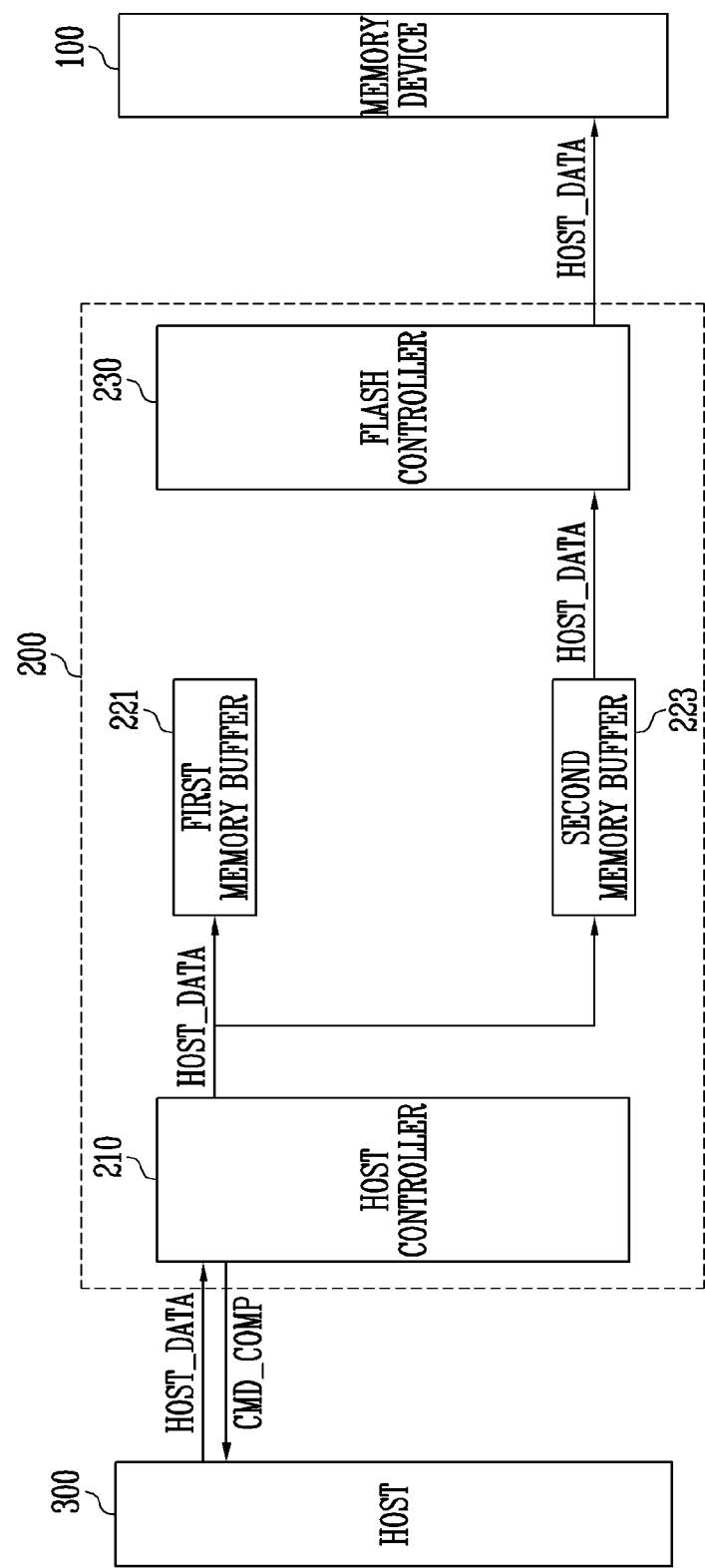
FIG. 7 illustrates another embodiment in which host data in a first memory buffer is moved to a second memory buffer.

FIG. 7 illustrates an embodiment in which host data in a first memory buffer is moved to a second memory buffer.

Referring to FIG. 7, the memory controller 200 of FIG. 7 may include a host controller 210, a first memory buffer 221, a second memory buffer 223, and a flash controller 230. Here, the first and second memory buffers 221 and 223 may be included in the memory buffers 220 of FIG. 1. In FIG. 7, of the components of the memory controller 200 illustrated in FIG. 1, a direct memory access device 240 is not shown.

Referring to FIGS. 5 to 7, FIG. 7 illustrates the case where, unlike FIGS. 5 and 6, host data HOST_DATA is output to the second memory buffer 223 at the same time that the host data HOST_DATA is output to the first memory buffer 221.

In an embodiment, the host 300 may output the host data HOST_DATA to be programmed to a memory device (e.g., memory device 100 of FIG. 1), together with a program request, to the host controller 210.

When the host controller 210 receives the host data HOST_DATA from the host 300, the host controller 210 may output the host data HOST_DATA not only to the first memory buffer 221 but also to the second memory buffer 223. When the first and second memory buffers 221 and 223 simultaneously receive the host data HOST_DATA, the data stored in the second memory buffer 223 may be output and programmed to the memory device (e.g., memory device 100 of FIG. 1).

In an embodiment, when the first memory buffer 221 receives all of the host data HOST_DATA from the host controller 210 even while the second memory buffer 223 is still receiving the host data HOST_DATA from the host controller 210, the host controller 210 may output a command completion response CMD_COMP to the host 300. Here, the command completion response CMD_COMP may indicate that the execution of the command has been completed.

That is, since the first and second memory buffers 221 and 223 simultaneously receive the host data HOST_DATA, the command completion response CMD_COMP is output to the host 300 even before all of the host data HOST_DATA is stored in the second memory buffer 223, thus completing the execution of the corresponding command.

In an embodiment, the host data HOST_DATA may be stored in the second memory buffer 223, and the stored data may be output to the memory device 100 through the flash controller 230. The memory device 100 may program the host data HOST_DATA received from the flash controller 230.

In an embodiment, after the host data HOST_DATA has been stored both in the first memory buffer 221 and in the second memory buffer 223, the first memory buffer 221 may release the allocation of the area in which the host data HOST_DATA is stored, and may store additional data in the corresponding area. The additional data may be new host data received from the host 300, or may be new flash data received from the memory device 100.

Thereafter, when the allocation of the first memory buffer 221 is released, new host data received from the host 300 through the host controller 210 may be stored in the first memory buffer 221, and/or new flash data received from the memory device 100 may be stored in the first memory buffer 221.

Figure 8:
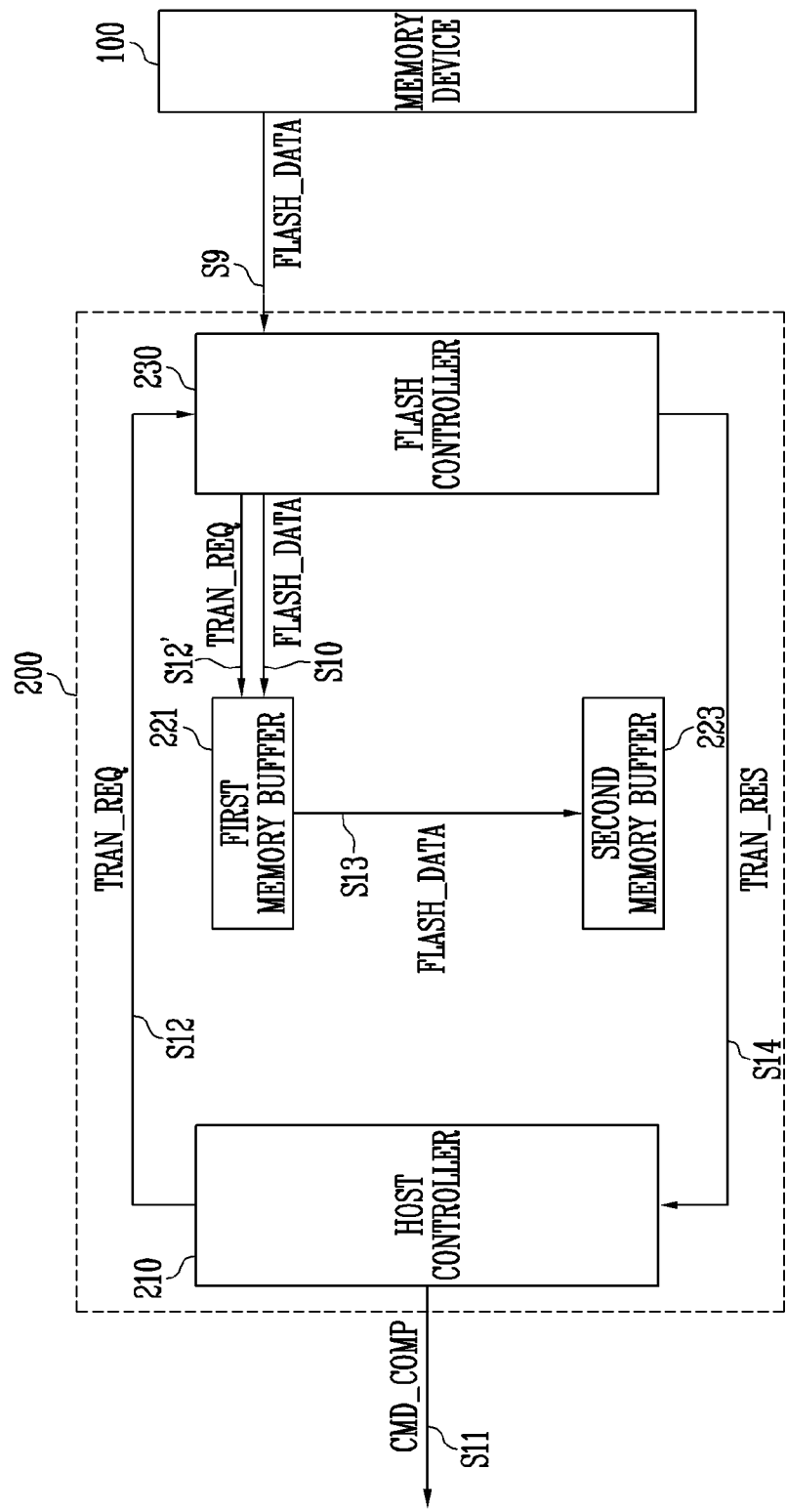
FIG. 8 illustrates an embodiment in which flash data is moved from a first memory buffer to a second memory buffer.

FIG. 8 illustrates an embodiment in which flash data is moved from a first memory buffer to a second memory buffer.

Referring to FIG. 8, the memory controller 200 of FIG. 8 may include a first memory buffer 221, a second memory buffer 223, and a flash controller 230. Here, the first and second memory buffers 221 and 223 may be included in the memory buffers 220 of FIG. 1.

In FIG. 8, of the components of the memory controller 200 illustrated in FIG. 1, a direct memory access device 240 is not shown.

In an embodiment, the first memory buffer 221 may be a static random access memory (SRAM), and the second memory buffer 223 may be a dynamic random access memory (DRAM). The first memory buffer 221 has the advantage of being faster than the second memory buffer 223, but the available capacity of the first memory buffer 221 may be smaller than that of the second memory buffer 223 for economic reasons. Therefore, as the utilization of the first memory buffer 221 is increased, the performance of a storage device (e.g., storage device 50 of FIG. 1) may be improved.

In an embodiment, in response to a read request from a host (e.g., host 300 of FIG. 1), flash data FLASH_DATA read from the memory device 100 may be stored in the first memory buffer 221, and the data stored in the first memory buffer 221 may be output to the host.

When caching of the data stored in the first memory buffer 221 is required, the present disclosure presents a scheme for improving the utilization of the first memory buffer 221 by moving the data to the second memory buffer 223 and then releasing a corresponding area allocated in the first memory buffer 221 to allow additional data to be stored in the area.

In an embodiment, the memory device 100 may output the flash data FLASH_DATA, obtained by reading the data programmed to the memory device 100, to the flash controller 230 in response to a read request from the host (e.g., host 300 of FIG. 1) (S9). The flash controller 230 may output the flash data FLASH_DATA, received from the memory device 100, to the first memory buffer 221 (S10). The data stored in the first memory buffer 221 may be output to the host.

In an embodiment, when all of the flash data FLASH_DATA is stored in the first memory buffer 221, the host controller 210 may output a command completion response CMD_COMP, indicating that the execution of the command has been completed, to the host 300 (S11). That is, the command completion response CMD_COMP may be output regardless of the completion of an operation corresponding to the command. Also, before the flash data FLASH_DATA is output to the host (e.g., host 300 of FIG. 1), the command completion response CMD_COMP may be output, and thus a read speed may be improved.

When the host (e.g., host 300 of FIG. 1) receives the command completion response CMD_COMP from the host controller 210, the memory device 100 may output new flash data to the flash controller 230, and the new flash data may be stored in the area of the first memory buffer 221.

In an embodiment, after the flash data FLASH_DATA has been stored in the first memory buffer 221, the flash data FLASH_DATA stored in the first memory buffer 221 may be moved to the second memory buffer 223. That is, in order to increase the utilization of the first memory buffer 221, the flash data FLASH_DATA stored in the first memory buffer 221 may be moved to the second memory buffer 223.

In detail, the host controller 210 may output to the flash controller 230 a transmission request TRAN_REQ instructing that the flash data FLASH_DATA stored in the first memory buffer 221 be moved to the second memory buffer 223 (S12), and the flash controller 230 may output the transmission request TRAN_REQ to the first memory buffer 221 (S12'). The first memory buffer 221 may transmit the stored flash data FLASH_DATA to the second memory buffer 223 in response to the transmission request TRAN_REQ (S13). The second memory buffer 223 may receive and store the flash data FLASH_DATA output from the first memory buffer 221.

Thereafter, in order to access the corresponding flash data FLASH_DATA, the second memory buffer 223 may be utilized. Further, since the flash data FLASH_DATA has been moved from the first memory buffer 221 to the second memory buffer 223, the area of the first memory buffer 221, which was allocated to store the flash data FLASH_DATA, may be released. When the allocation of the area of the first memory buffer 221 is released, additional data may be stored in the corresponding area. The additional data may be new host data received from the host, or new flash data received from the memory device 100.

Furthermore, when the movement of all of the flash data FLASH_DATA from the first memory buffer 221 to the second memory buffer 223 is completed in response to the transmission request TRAN_REQ, the flash controller 230 may output a transmission completion response TRAN_RES to the host controller 210 (S14).

In an embodiment, when the allocation of the area of the first memory buffer 221 is released, additional data may be stored in the area of the first memory buffer 221. The additional data may be new host data received from the host, or new flash data received from the memory device 100.

As a result, the data stored in the first memory buffer 221 is moved to the second memory buffer 223, after which the second memory buffer 223 is accessed and the allocation of the area of the first memory buffer 221 is released, thus increasing the utilization of the first memory buffer 221. As the utilization of the first memory buffer 221 is increased, the performance of the storage device (e.g., storage device 50 of FIG. 1) may be improved.

Figure 9:
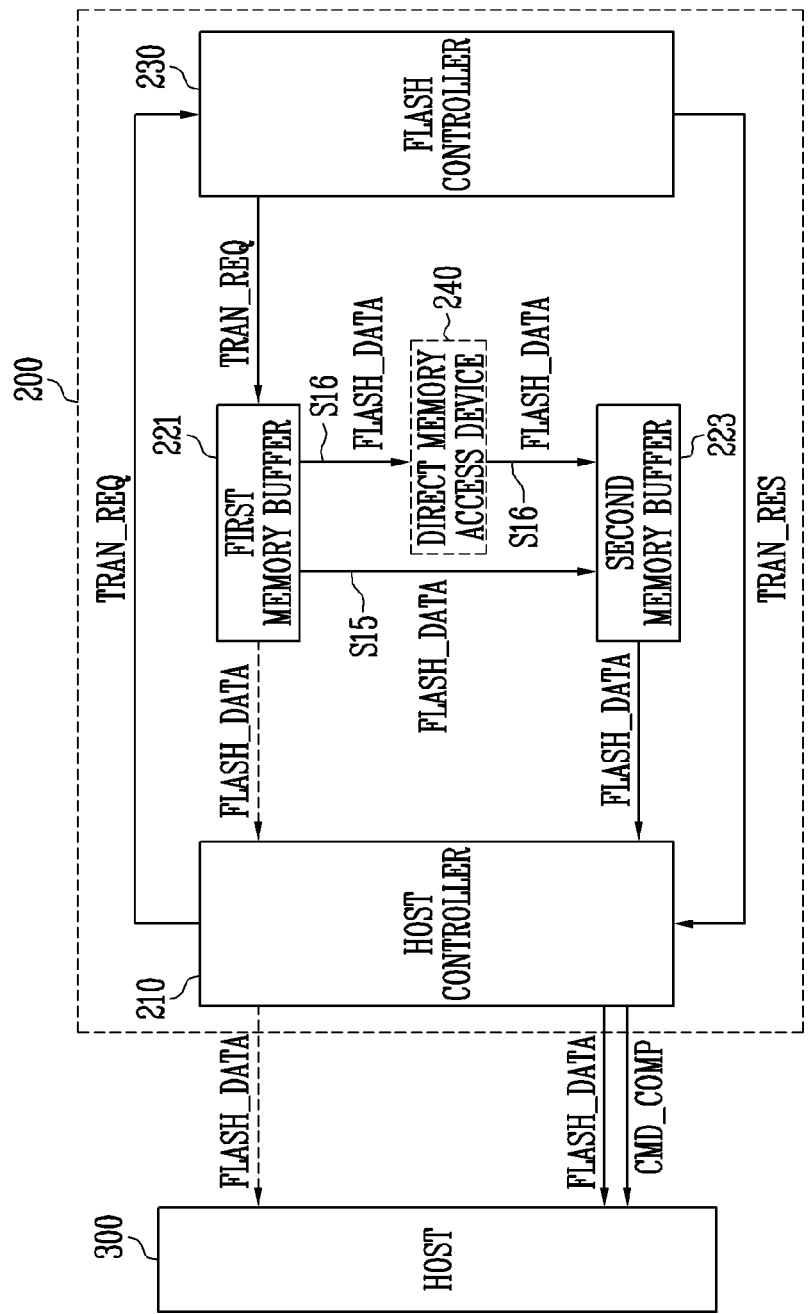
FIG. 9 illustrates a method in which flash data in a first memory buffer is moved to a second memory buffer.

FIG. 9 illustrates a method in which flash data in a first memory buffer is moved to a second memory buffer.

Referring to FIG. 9, the memory controller 200 of FIG. 9 may include a host controller 210, a first memory buffer 221, a second memory buffer 223, a flash controller 230, and a direct memory access device 240. Here, the first and second memory buffers 221 and 223 may be included in the memory buffers 220 of FIG. 1.

In an embodiment, flash data FLASH_DATA that is transmitted from the flash controller 230 and stored in the first memory buffer 221 may be transmitted to the host controller 210. The flash data FLASH_DATA transmitted to the host controller 210 may be output to the host 300. When the flash data FLASH_DATA is output to the host 300, a read request from the host 300 may be completed. However, when the first memory buffer 221 is occupied by the flash data FLASH_DATA for a long period of time, there is a concern that the utilization of the first memory buffer 221 will be deteriorated.

In an embodiment, in order to increase the utilization of the first memory buffer 221, the flash data FLASH_DATA stored in the first memory buffer 221 may be moved to the second memory buffer 223.

In detail, the host controller 210 may output a transmission request TRAN_REQ to the flash controller 230, and the flash controller 230 may output the transmission request TRAN_REQ to the first memory buffer 221. The transmission request TRAN_REQ may be a request to transmit the flash data FLASH_DATA stored in the first memory buffer 221 to the second memory buffer 223.

The first memory buffer 221 may transmit the flash data FLASH_DATA to the second memory buffer 223 in response to the transmission request TRAN_REQ. The second memory buffer 223 may receive and store data transmitted from the first memory buffer 221.

In an embodiment, the data output from the first memory buffer 221 may be directly transmitted to the second memory buffer 223 (S15). In another embodiment, the data output from the first memory buffer 221 may be transmitted to the second memory buffer 223 using the direct memory access device 240 (S16).

The second memory buffer 223 may store the flash data FLASH_DATA transmitted from the first memory buffer 221. In this case, when the movement of all of the flash data FLASH_DATA from the first memory buffer 221 to the second memory buffer 223 is completed, the flash controller 230 may output a transmission completion response TRAN_RES to the host controller 210.

Thereafter, when the allocation of the first memory buffer 221 is released, new host data received from the host 300 through the host controller 210 may be stored in the first memory buffer 221, or new flash data received from the memory device (e.g., memory device 100 of FIG. 8) may be stored in the first memory buffer 221.

In an embodiment, the second memory buffer 223 may store the flash data FLASH_DATA, output from the first memory buffer 221, and output the flash data FLASH_DATA to the host controller 210. The host controller 210 may output the received flash data FLASH_DATA to the host 300.

In an embodiment, after the flash data FLASH_DATA stored in the first memory buffer 221 has been moved to the second memory buffer 223, the first memory buffer 221 may release the allocation of the area in which the flash data FLASH_DATA was stored, and may store additional data in the corresponding area. The additional data may be new host data received from the host 300, or new flash data received from the memory device (e.g., memory device 100 of FIG. 8).

Figure 10:
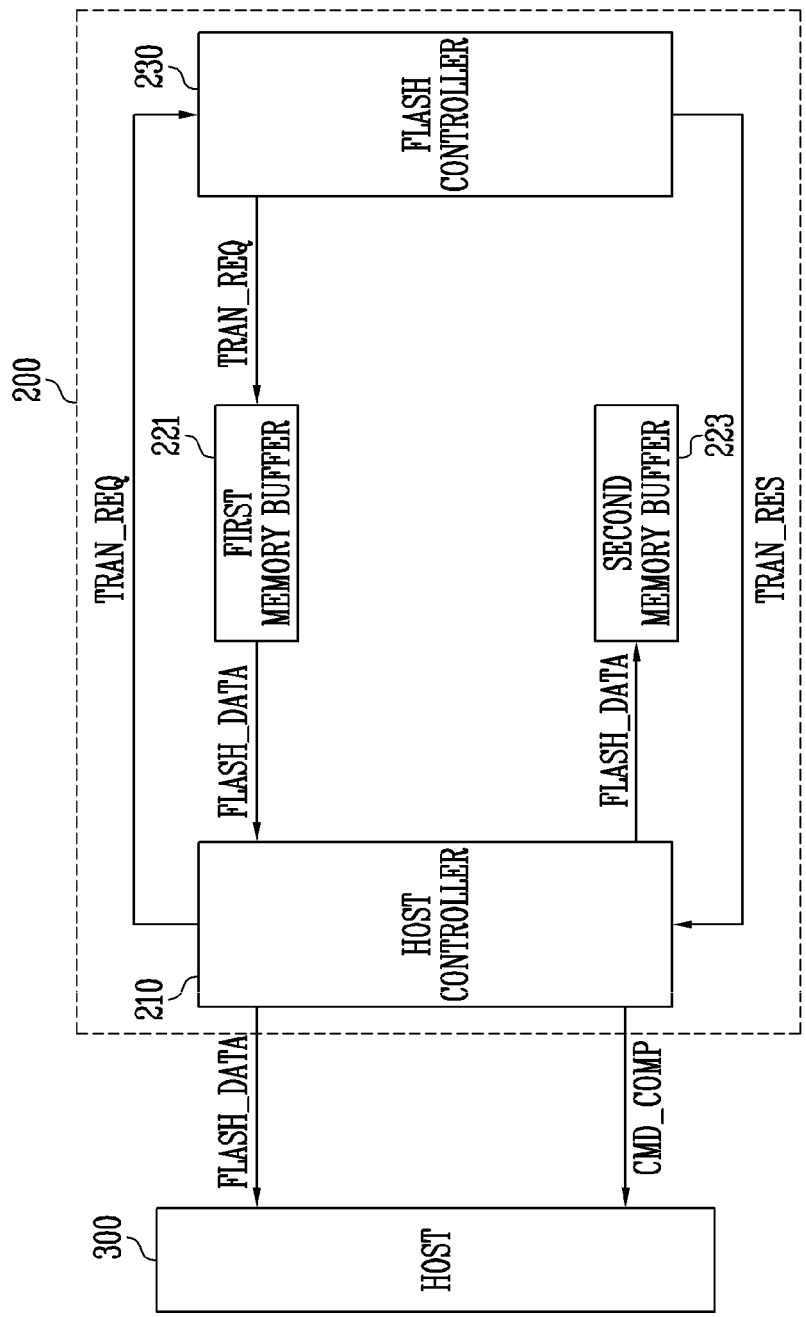
FIG. 10 illustrates another embodiment in which flash data in a first memory buffer is moved to a second memory buffer.

FIG. 10 illustrates an embodiment in which flash data in a first memory buffer is moved to a second memory buffer.

Referring to FIG. 10, the memory controller 200 of FIG. 10 may include a host controller 210, a first memory buffer 221, a second memory buffer 223, and a flash controller 230. Here, the first and second memory buffers 221 and 223 may be included in the memory buffers 220 of FIG. 1. In FIG. 10, of the components of the memory controller 200 illustrated in FIG. 1, a direct memory access device 240 is not shown.

In an embodiment, in order to increase the utilization of the first memory buffer 221, flash data FLASH_DATA stored in the first memory buffer 221 may be moved to the second memory buffer 223.

In detail, the host controller 210 may output to the flash controller 230 a transmission request TRAN_REQ instructing that the flash data FLASH_DATA stored in the first memory buffer 221 be moved to the second memory buffer 223, and the flash controller 230 may output the transmission request TRAN_REQ to the first memory buffer 221.

The first memory buffer 221 may transmit the flash data FLASH_DATA to the host controller 210 in response to the transmission request TRAN_REQ. The host controller 210 may output the flash data FLASH_DATA received from the first memory buffer 221 to the host 300.

Here, the host controller 210 may output the flash data FLASH_DATA not only to the host 300 but also to the second memory buffer 223. That is, in order to output the flash data FLASH_DATA to the host 300, the host controller 210 may read the flash data FLASH_DATA from the first memory buffer 221 while transmitting the read flash data FLASH_DATA to the second memory buffer 223. The second memory buffer 223 may store the flash data FLASH_DATA received from the host controller 210.

In an embodiment, after the flash data FLASH_DATA stored in the first memory buffer 221 has been moved to the second memory buffer 223, the first memory buffer 221 may release the allocation of the area in which the flash data FLASH_DATA was stored, and may store additional data in the corresponding area. The additional data may be new host data received from the host 300, or new flash data received from the memory device (e.g., memory device 100 of FIG. 8).

In detail, when the movement of all the flash data FLASH_DATA received from the host controller 210 to the second memory buffer 223 is completed, the flash controller 230 may output a transmission completion response TRAN_RES to the host controller 210.

Thereafter, when the allocation of the first memory buffer 221 is released, the new host data received from the host 300 through the host controller 210, the new flash data received from the memory device 100 through the flash controller 230, or both may be stored in the first memory buffer 221.

Figure 11:
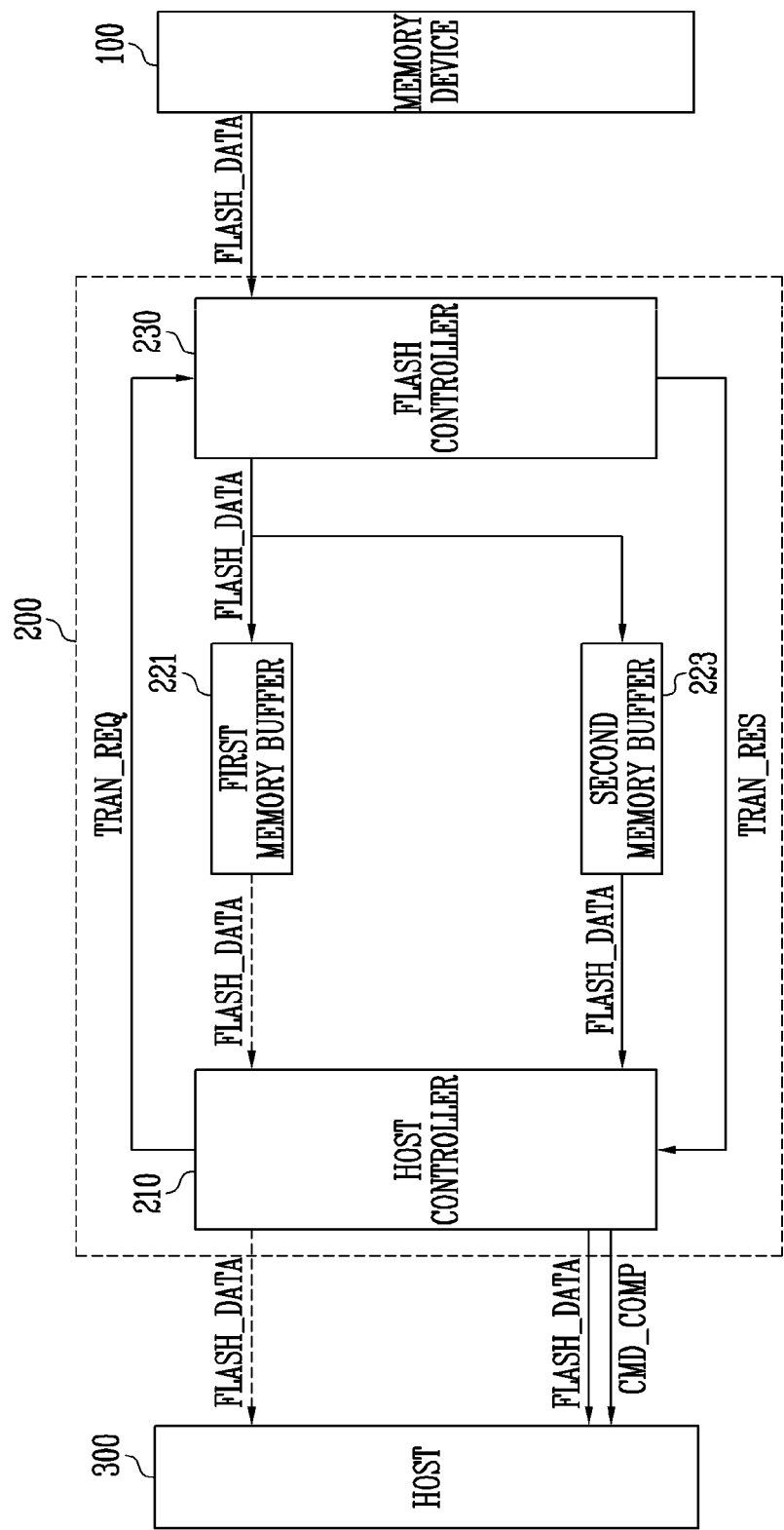
FIG. 11 illustrates another embodiment in which flash data in a first memory buffer is moved to a second memory buffer.

FIG. 11 illustrates an embodiment in which flash data in a first memory buffer is moved to a second memory buffer.

Referring to FIG. 11, the memory controller 200 of FIG. 11 may include a host controller 210, a first memory buffer 221, a second memory buffer 223, and a flash controller 230. Here, the first and second memory buffers 221 and 223 may be included in the memory buffers 220 of FIG. 1. In FIG. 11, of the components of the memory controller 200 illustrated in FIG. 1, a direct memory access device 240 is not shown.

In an embodiment, flash data FLASH_DATA that is transmitted from the flash controller 230 and stored in the first memory buffer 221 may be transmitted to the host controller 210. The flash data FLASH_DATA transmitted to the host controller 210 may be output to the host 300. When the flash data FLASH_DATA is output to the host 300, the read request from the host 300 may be completed. However, when the first memory buffer 221 is occupied by the flash data FLASH_DATA for a long period of time, there is a concern that the utilization of the first memory buffer 221 will be deteriorated.

However, when the flash data FLASH_DATA is output to the first memory buffer 221 while being output to the second memory buffer 223, the utilization of the first memory buffer 221 may be increased.

In an embodiment, the flash data FLASH_DATA corresponding to the read request from the host 300 may be output from the memory device 100 to the flash controller 230.

When the flash controller 230 receives the flash data FLASH_DATA from the memory device 100, the flash controller 230 may output the flash data FLASH_DATA not only to the first memory buffer 221 but also to the second memory buffer 223. In this case, the flash data FLASH_DATA may be stored in the second memory buffer 223, and the stored data may be output to the host 300 through the host controller 210.

In detail, the host controller 210 may output to the flash controller 230 a transmission request TRAN_REQ instructing that the flash data FLASH_DATA stored in the first memory buffer 221 be moved to the second memory buffer 223, and the flash controller 230 may output the flash data FLASH_DATA to the first and second memory buffers 221 and 223 in response to the transmission request TRAN_REQ.

In an embodiment, after the flash data FLASH_DATA has been stored in the first memory buffer 221 and the second memory buffer 223, the first memory buffer 221 may release the allocation of the area in which the flash data FLASH_DATA was stored, and may store additional data in the corresponding area. The additional data may be new host data received from the host 300, new flash data received from the memory device 100, or both.

In detail, when the movement of all the flash data FLASH_DATA to the second memory buffer 223 is completed, the flash controller 230 may output the transmission completion response TRAN_RES to the host controller 210.

Thereafter, when the allocation of the first memory buffer 221 is released, the new host data received from the host 300 through the host controller 210, the new flash data received from the memory device 100 through the flash controller 230, or both may be stored in the first memory buffer 221.

Figure 12:
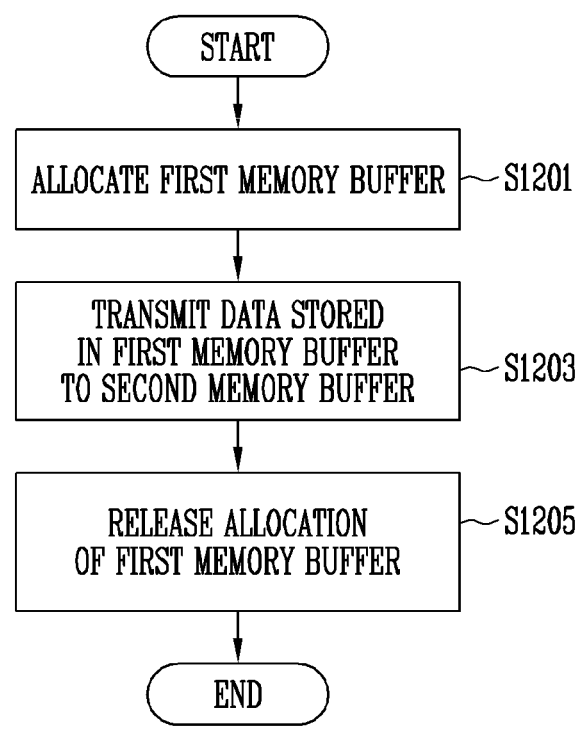
FIG. 12 is a flowchart illustrating operation of a memory controller according to an embodiment of the present disclosure.

FIG. 12 is a flowchart illustrating the operation of a memory controller according to an embodiment of the present disclosure.

Referring to FIG. 12, at step S1201, the memory controller may allocate a first memory buffer so as to store host data or flash data. The host data may be data that is received, together with a program request, from the host, and the flash data may be data that is read from the memory device in response to a read request from the host. Further, the first memory buffer may be one of buffers included in a plurality of memory buffers, and may be a static random access memory (SRAM). The host data may be output and programmed to the memory device, and the flash data may be output to the host.

At step S1203, the memory controller may transmit the data stored in the first memory buffer to a second memory buffer. The second memory buffer may be one of buffers included in the plurality of memory buffers, and may be a dynamic random access memory (DRAM).

In an embodiment, when the first memory buffer is occupied by the data for a long period of time, there is a concern that the utilization of the first memory buffer will be deteriorated, and thus the data in the first memory buffer may be transmitted to and stored in the second memory buffer.

At step S1205, the memory controller may release the allocation of the portion of the first memory buffer in which the data transmitted to the second memory buffer was stored.

In detail, after the data stored in the first memory buffer has been transmitted to the second memory buffer, the second memory buffer may be accessed so as to access the corresponding data. Therefore, since the first memory buffer is not accessed any further, the portion of the first memory buffer allocated to store the corresponding data may be released. As a result, as the utilization of the first memory buffer is increased, the performance of the storage device may be improved.

Figure 13:
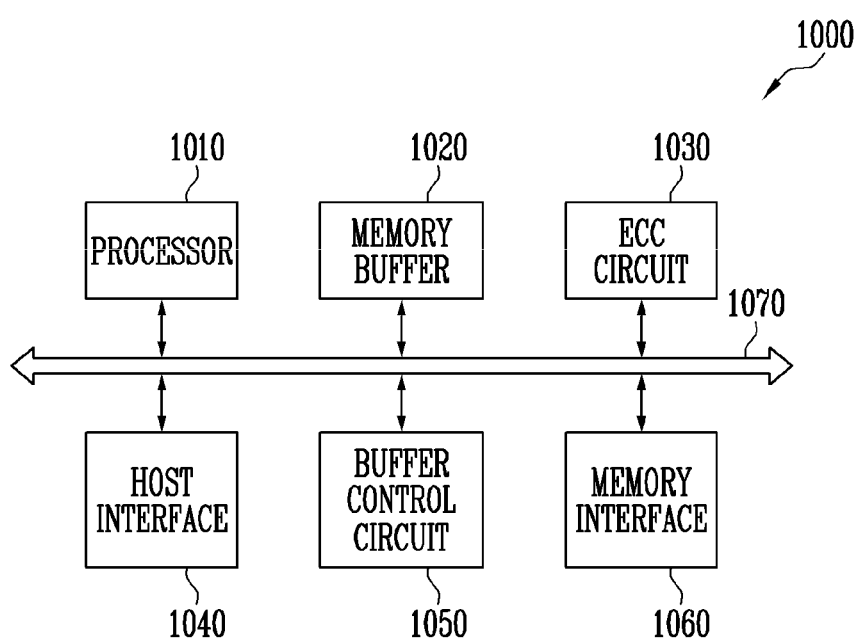
FIG. 13 is a diagram illustrating an embodiment of a memory controller of FIG. 1.

FIG. 13 is a diagram illustrating an embodiment of the memory controller 200 of FIG. 1.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 13, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA using the mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may run software or firmware to perform the randomizing or derandomizing operation.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, the host interface 1040 may include a host controller. The host controller may receive a program request and host data corresponding to the program request from the host (e.g., host 300 of FIG. 1), and may control the transmission of the host data so that the host data is programmed to the memory device (e.g., memory device 100 of FIG. 1).

In an embodiment, the memory buffer 1020 may include first and second memory buffers. The first memory buffer may be a static RAM (SRAM), and the second memory buffer may be a dynamic RAM (DRAM).

In an embodiment, the host controller included in the host interface 1040 may control the memory buffer 1020 so that the host data is moved from the first memory buffer to the second memory buffer.

In an embodiment, the memory interface 1060 may include a flash controller. The flash controller may receive flash data corresponding to a read request from the host (e.g., host 300 of FIG. 1) from the memory device (e.g., memory device 100 of FIG. 1), and may control the transmission of the flash data so that the flash data is output to the host. For example, the flash controller included in the memory interface 1060 may control the memory buffer 1020 so that the flash data is moved from the first memory buffer to the second memory buffer.

Figure 14:
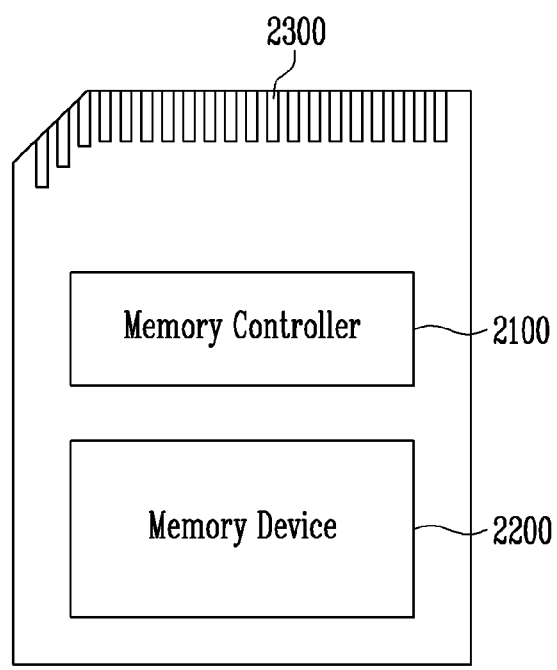
FIG. 14 is a block diagram illustrating a memory card system to which a storage device according to an embodiment of the present disclosure is applied.

FIG. 14 is a block diagram illustrating a memory card system to which the storage device according to an embodiment of the present disclosure is applied.

Referring to FIG. 14, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory device 2200 may be implemented in the same way as the memory device 100 described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (RRAM), a Ferroelectric RAM (FRAM), a Spin Transfer Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

In an embodiment, the memory controller 2100 may receive a program request and host data corresponding to the program request from the host (e.g., host 300 of FIG. 1), and may control the transmission of the host data so that the host data is programmed to the memory device 2200.

In an embodiment, the memory controller 2100 may include first and second memory buffers. The first memory buffer may be a static RAM (SRAM), and the second memory buffer may be a dynamic RAM (DRAM).

In an embodiment, the memory controller 2100 may move the host data from the first memory buffer to the second memory buffer.

In an embodiment, the memory controller 2100 may receive flash data, corresponding to a read request from the host (e.g., host 300 of FIG. 1), from the memory device 2200, and may control the transmission of the flash data so that the flash data is output to the host. For example, the memory controller 2100 may move the flash data from the first memory buffer to the second memory buffer.

Figure 15:
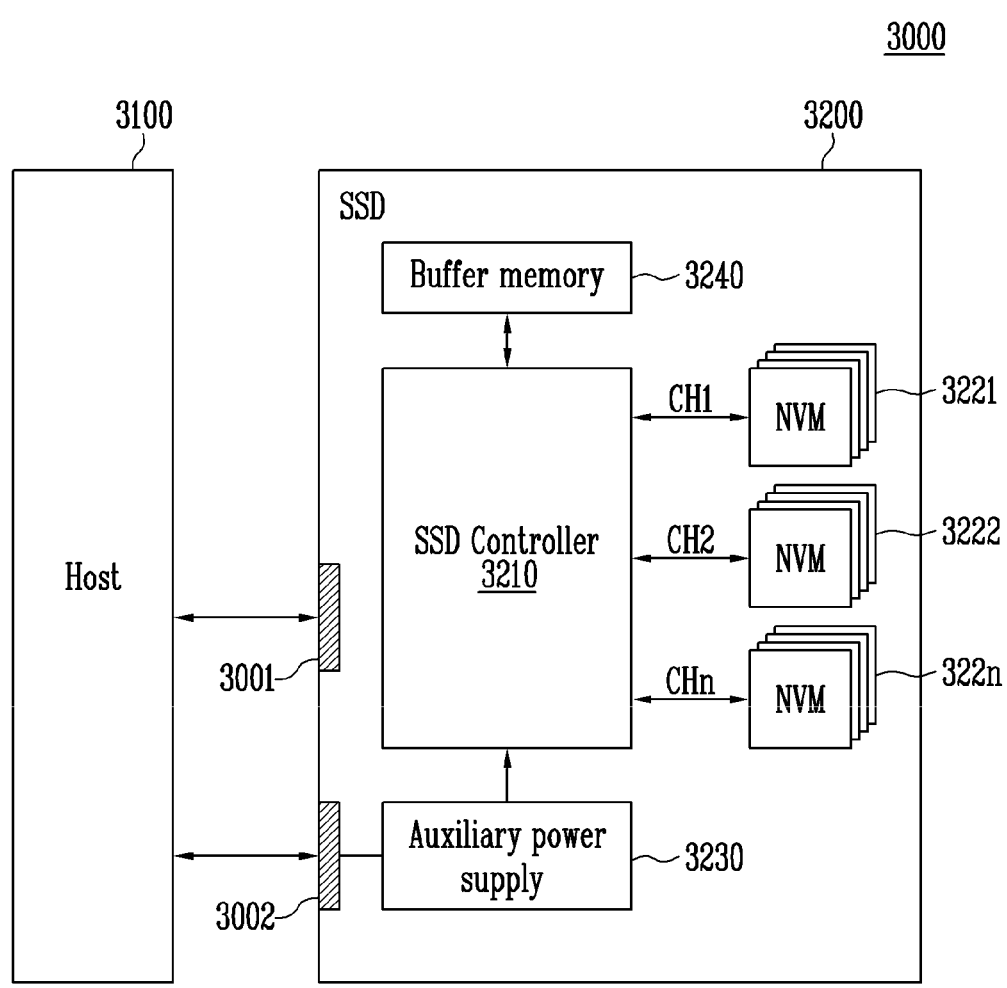
FIG. 15 is a block diagram illustrating an example of a solid state drive (SSD) system to which a storage device according to an embodiment of the present disclosure is applied.

FIG. 15 is a block diagram illustrating an example of a solid state drive (SSD) system to which a storage device according to an embodiment of the present disclosure is applied.

Referring to FIG. 15, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, RRAM STT-MRAM, and PRAM.

In an embodiment, the SSD controller 3210 may receive a program request and host data corresponding to the program request from the host 3100, and may control the transmission of the host data so that the host data is programmed to the flash memories 3221 to 322n.

In an embodiment, the buffer memory 3240 may include first and second memory buffers. The first memory buffer may be a static RAM (SRAM), and the second memory buffer may be a dynamic RAM (DRAM).

In an embodiment, the SSD controller 3210 may move the host data from the first memory buffer to the second memory buffer.

In an embodiment, the SSD controller 3210 may receive flash data, corresponding to a read request from the host 3100, from the plurality of flash memories 3221 to 322n, and may control the transmission of the flash data so that the flash data is output to the host 3100. For example, the SSD controller 3210 may move the flash data from the first memory buffer to the second memory buffer.

Figure 16:
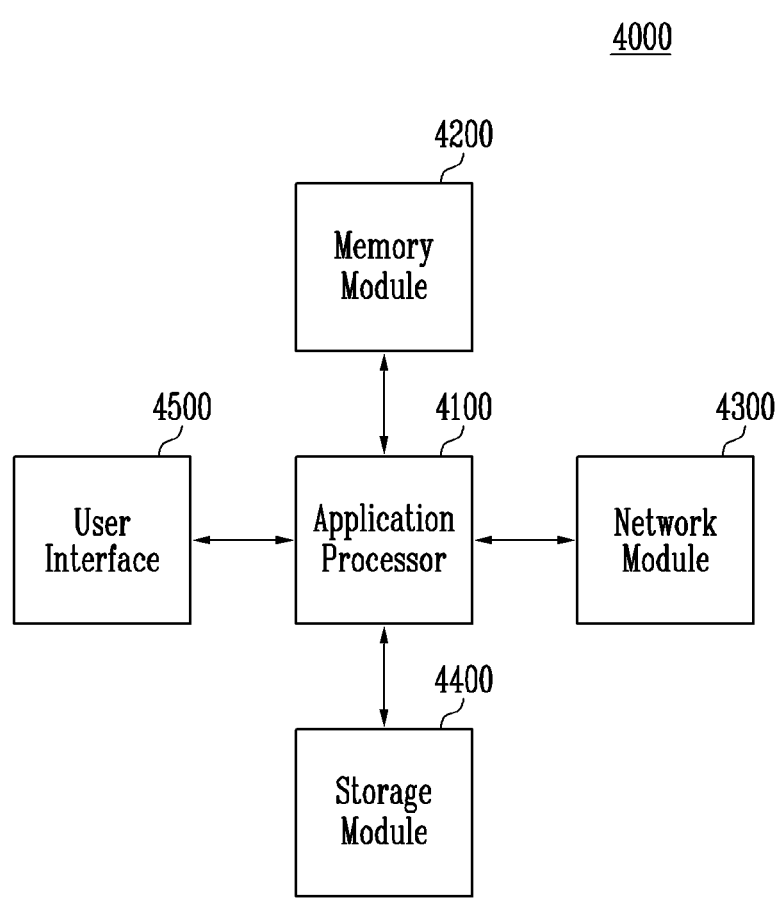
FIG. 16 is a block diagram illustrating a user system to which a storage device according to an embodiment of the present disclosure is applied.

FIG. 16 is a block diagram illustrating a user system to which the storage device according to an embodiment of the present disclosure is applied.

Referring to FIG. 16, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, RRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device described above with reference to FIGS. 2 and 3. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In an embodiment, the application processor 4100 may receive a program request and host data corresponding to the program request from the host (e.g., host 300 of FIG. 1), and may control the transmission of the host data so that the host data is programmed to the storage module 4400.

In an embodiment, the memory module 4200 may include first and second memory buffers. The first memory buffer may be a static RAM (SRAM), and the second memory buffer may be a dynamic RAM (DRAM).

In an embodiment, the application processor 4100 may move the host data from the first memory buffer to the second memory buffer.

In an embodiment, the application processor 4100 may receive flash data, corresponding to a read request from the host (e.g., host 300 of FIG. 1), from the storage module 4400, and may control the transmission of the flash data so that the flash data is output to the host. For example, the application processor 4100 may move the flash data from the first memory buffer to the second memory buffer.

In accordance with the present disclosure, the utilization of a static random access memory (SRAM) may be increased by copying data stored in the SRAM to a dynamic random access memory (DRAM).

What is claimed is:

1. A memory controller for controlling a memory device, the memory controller comprising:
 a host controller configured to receive a program request and host data corresponding to the program request from a host and to control transmission of the host data to program the host data to the memory device; and
a memory buffer component including a first memory buffer and a second memory buffer configured to store the host data received from the host controller,
wherein the host controller is configured to:
control the memory buffer component to transfer the host data from the first memory buffer to the second memory buffer, and
receive new host data from the host in response to a transmission completion response, received from the first memory buffer, indicating that the host data has been transmitted to the second memory buffer, and
wherein the host data stored in the second memory buffer is provided to the memory device.

2. The memory controller according to claim 1, wherein the first memory buffer is implemented as a static random access memory (SRAM), and the second memory buffer is implemented as a dynamic random access memory (DRAM).

3. The memory controller according to claim 1, wherein the host controller is configured to, after the host data has been stored in the first memory buffer, output a transmission request to the first memory buffer, the transmission request instructing the host data to be moved from the first memory buffer to the second memory buffer.

4. The memory controller according to claim 3, wherein the first memory buffer is configured to:
transmit the host data to the second memory buffer in response to the transmission request, and
when all of the host data has been transmitted to the second memory buffer, output a transmission completion response.

5. The memory controller according to claim 4, wherein:
the first memory buffer is configured to release an area that was allocated to store the host data, and thereafter store the new host data received from the host controller.

6. The memory controller according to claim 4, wherein the first memory buffer is configured to, after the transmission completion response has been output, store new flash data received from the memory device.

7. The memory controller according to claim 3, further comprising:
a direct memory access device configured to receive the host data output from the first memory buffer in response to the transmission request and transmit the received host data to the second memory buffer.

8. The memory controller according to claim 3, further comprising:
a flash controller configured to receive the host data output from the first memory buffer in response to the transmission request and to output the host data to the memory device so as to program the host data.

9. The memory controller according to claim 8, wherein the flash controller is configured to transmit the host data to the second memory buffer.

10. The memory controller according to claim 9, wherein the first memory buffer is configured to, when all of the host data is stored in the second memory buffer, release an area in which the host data was stored.

11. A memory controller for controlling a memory device, the memory controller comprising:
a flash controller configured to receive, from the memory device, flash data corresponding to a read request from a host and to control transmission of the flash data to output the flash data to the host; and
a memory buffer component including a first memory buffer and a second memory buffer configured to store the flash data received from the flash controller,
wherein the flash controller is configured to:
control the memory buffer component so that the flash data is moved from the first memory buffer to the second memory buffer, and
receive new flash data from the memory device after outputting a transmission completion response, to a host controller, indicating that the flash data has been transmitted to the second memory buffer, and
wherein the flash data stored in the second memory buffer is provided to the host.

12. The memory controller according to claim 11, wherein the first memory buffer is implemented as a static random access memory (SRAM), and the second memory buffer is implemented as a dynamic random access memory (DRAM).

13. The memory controller according to claim 11, further comprising:
the host controller configured to output information, indicating whether an operation corresponding to the read request has been completed, to the host based on whether all of the flash data has been moved to the first memory buffer,
wherein the host controller is configured to, after the flash data has been stored in the first memory buffer, output a transmission request to the first memory buffer through the flash controller, the transmission request instructing the flash data to be moved from the first memory buffer to the second memory buffer.

14. The memory controller according to claim 13, wherein:
the first memory buffer is configured to transmit the flash data to the second memory buffer in response to the transmission request, and
the flash controller is configured to, when all of the flash data has been transmitted to the second memory buffer, output the transmission completion response to the host controller.

15. The memory controller according to claim 14, wherein:
the host controller is configured to receive new host data from the host, and
the first memory buffer is configured to release an area that was allocated to store the flash data, and thereafter store the new host data received from the host controller.

16. The memory controller according to claim 14, wherein the first memory buffer is configured to, after the transmission completion response has been output, store new flash data received from the memory device.

17. The memory controller according to claim 13, further comprising:
a direct memory access device configured to receive the flash data output from the first memory buffer in response to the transmission request and transmit the received flash data to the second memory buffer.

18. The memory controller according to claim 13, further comprising:
a host controller configured to receive the flash data output from the first memory buffer in response to the transmission request, and output the flash data corresponding to the read request to the host.

19. The memory controller according to claim 18, wherein the host controller is configured to transmit the flash data to the second memory buffer.

20. The memory controller according to claim 19, wherein the first memory buffer is configured to, when all of the flash data has been stored in the second memory buffer, release an area in which the flash data was stored.

\* \* \* \* \*